Sept. 23, 1952  A. HUYTON  2,611,243
COMBUSTION CHAMBER FOR PRIME MOVERS
Filed Jan. 7, 1946
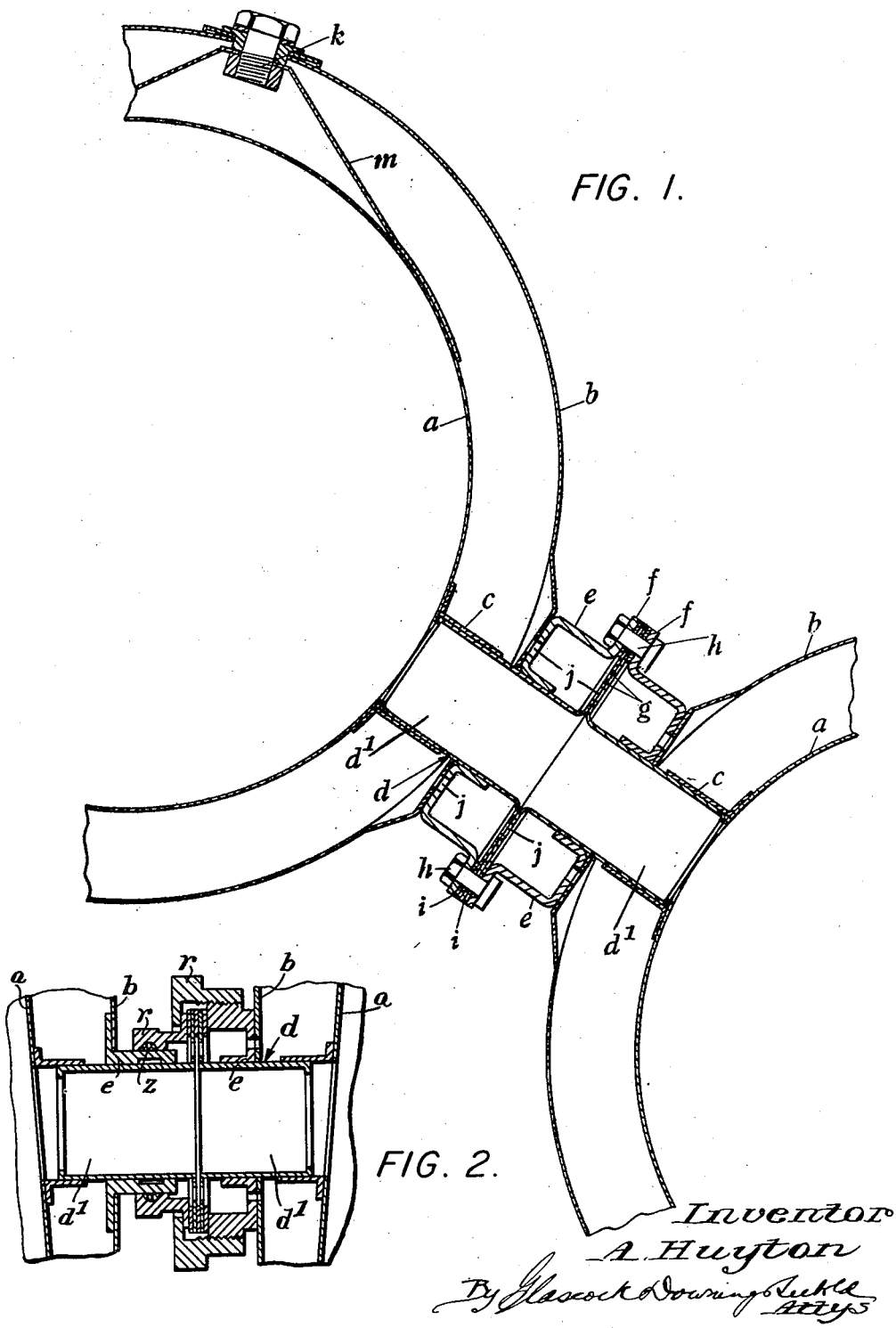

Patented Sept. 23, 1952

2,611,243

UNITED STATES PATENT OFFICE 2,611,243

COMBUSTION CHAMBER FOR PRIME MOVERS

Alfred Huyton, Birmingham, England, assignor to Joseph Lucas Limited, Birmingham, England Application January 7, 1946, Serial No. 639,630
In Great Britain September 1, 1944

Section 1, Public Law 690, August 8, 1946.
Patent expires September 1, 1964

4 Claims. (Cl. 60—39.69)

This invention relates to prime movers of the kind in which a plurality of combustion chambers are arranged around a common axis and adapted to discharge their products of combustion through a turbine rotor, each such chamber being mounted within an air jacket. Hitherto each chamber has been secured within its jacket by means of a plurality of radial studs. Also the chambers have been arranged in lateral communication with each other by means of pipes (herein termed balancing pipes). The object of the present invention is to provide improved means for supporting the combustion chambers within their jackets.

The invention comprises constructions wherein balancing pipes which establish lateral communication between the combustion chambers serve also (wholly or in part) to support the combustion chambers within their air jackets.

In the accompanying sheet of explanatory drawing:

Figure 1 is a sectional end elevation of a part of a prime mover embodying the invention.

Figure 2 is a view illustrating a further modified form of the invention.

In the drawing $a$ indicates cylindrical or like sheet metal combustion chambers, and $b$ air jackets in which the combustion chambers are arranged, it being understood that only sufficient structure is shown to illustrate the invention, and that the examples shown each form part of a prime mover of the kind in which a plurality of the illustrated air-jacketed combustion chambers are arranged around a common axis and adapted to discharge their products of combustion through a turbine rotor.

In carrying the invention into effect as shown in Figure 1, I form on or secure to the exterior of each combustion chamber $a$ and at each of a pair of positions at which a balancing tube is to be attached, a hollow boss $c$ into which one end of a balancing pipe $d$ can be inserted. Also at each of corresponding positions on each jacket $b$ I secure a hollow boss $e$ having a flange $f$ at its outer end. Each balancing pipe $d$ consists of two similar parts $d^1$, one end of each of which is adapted to be inserted through a jacket boss as $e$ and into a combustion chamber boss as $c$, the adjacent ends of the pipe parts being formed with flanges $g$. After the pipe parts $d^1$ have been placed into position their flanged ends are brought together and clamped between the faces of the flanges $f$ on the jacket bosses $e$, the latter being secured together by screws or bolts $h$ inserted through their flanges and through the flanged ends of the pipe parts. If required washers as $i$ may be arranged between any or all of the adjacent faces of the flanges $f$, $g$. The inner ends of the jacket bosses $e$ and the flanged ends of the pipe parts $d^1$ are formed with apertures $j$ for establishing intercommunication between the jackets $b$.

In the above described arrangement, the balancing pipes as $d$ not only interconnect adjacent combustion chambers $a$ but also serve to support the latter in proper relation with their jackets $b$. The two balancing pipes $d$ associated with each combustion chamber $a$ are situated at opposite sides of the chamber at about 120° apart, and may serve as the sole supports for the chamber, but if desired a screwed stud $k$ may also be provided for securing the chamber to its jacket $b$ at a position mid-way between the balancing pipes, this stud being arranged to pass through the jacket and through a sheet metal attachment piece $m$ on the chamber.

In the modification shown in Figure 2, I employ for securing together the two parts $d^1$ of each balancing pipe $d$ a pair of interengaging flanged rings $r$ which are respectively screwed and slidably fitted on the adjacent jacket bosses $e$ so as to clamp the flanged ends of the pipe parts between one of these bosses and the slidable ring, a seal or packing $z$ being provided in the slidable ring.

It will be apparent from the foregoing that the invention is capable of being carried out in a variety of ways, and the invention is not limited to the examples described. In all cases however, the balancing pipes are adapted to serve not only their normal purpose of interconnecting adjacent combustion chambers, but also (wholly or in part) to support the said chamber within and in proper relation with the surrounding jackets.

Having thus described my invention what I claim as new and desire to secure by Letters Patent is:

1. A prime mover having in combination a plurality of combustion chambers arranged around a common axis, air jackets in which the combustion chambers are mounted, hollow bosses on the combustion chambers and air jackets, two-part balancing pipes establishing lateral communication between adjacent combustion chambers, each part of said two-part pipes being arranged to pass through one of the hollow bosses on the adjacent air jacket and into one of the hollow bosses on the corresponding combustion chamber, so that the balancing pipes serve also at least in part to support the combustion chambers within their air jackets, flanges on adjacent ends of the balancing pipe parts, and means securing said flanges together.

2. A prime mover as claimed in claim 1, in which the hollow bosses on the air jackets are provided with flanges between which the flanges on the adjacent ends of the corresponding balancing pipe parts are secured.

3. A prime mover as claimed in claim 1 and having in combination with each two-part balancing pipe, interengaging screw threaded rings which serve to clamp together the flanges on the adjacent ends of the corresponding balancing pipe parts.

4. A prime mover as claimed in claim 1 and having in combination with each two-part balancing pipe, a ring which is slidable on one of the associated jacket bosses, and between which and the other of these bosses the flanges on the adjacent ends of the balancing pipe parts are clamped.

ALFRED HUYTON.

REFERENCES CITED

The following references are of record in the file of this patent:

UNITED STATES PATENTS

| Number | Name | Date |
| --- | --- | --- |
| 1,608,446 | Trent | Nov. 23, 1926 |
| 1,888,026 | Chapman | Nov. 15, 1932 |
| 2,404,335 | Whittle | July 16, 1946 |
| 2,445,114 | Halford | July 13, 1948 |